United States Patent
Lee et al.

(10) Patent No.: US 9,997,130 B2
(45) Date of Patent: Jun. 12, 2018

(54) DISPLAY APPARATUS FOR DISPLAYING ADDITIONAL INFORMATION ON TRANSPARENT DISPLAY REGION

(71) Applicant: SAMSUNG ELECTRONICS CO., LTD., Suwon-si (KR)

(72) Inventors: Yong-hoon Lee, Yongin-si (KR); Jong-hee Sohn, Seoul (KR); So-young Yun, Seoul (KR); Han-chul Jung, Seongnam-si (KR); Na-ri Kim, Seoul (KR); Jun-won Bae, Yongin-si (KR); Jung-yeob Oh, Seongnam-si (KR); Sang-min Hyun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 13/761,717

(22) Filed: Feb. 7, 2013

(65) Prior Publication Data

US 2013/0201176 A1     Aug. 8, 2013

Related U.S. Application Data

(60) Provisional application No. 61/596,634, filed on Feb. 8, 2012.

(30) Foreign Application Priority Data

Dec. 7, 2012    (KR) ........................ 10-2012-0141968

(51) Int. Cl.
G09G 5/00      (2006.01)
G06F 1/16      (2006.01)
(Continued)

(52) U.S. Cl.
CPC .......... *G09G 5/003* (2013.01); *G06F 1/1601* (2013.01); *G06F 1/1626* (2013.01);
(Continued)

(58) Field of Classification Search
CPC ...... E06B 2009/2464; E06B 9/24; G09G 3/36
See application file for complete search history.

(56) References Cited

U.S. PATENT DOCUMENTS 8,289,345 B2   10/2012  Muikaichi et al.
8,548,528 B2   10/2013  Kim et al.
(Continued)

FOREIGN PATENT DOCUMENTS

CN    101542587 A    9/2009
CN    101996620 A    3/2011
(Continued)

OTHER PUBLICATIONS

International Search Report dated Jun. 21, 2013, issued by the International Searching Authority in counterpart International Application No. PCT/KR2013/001047.
(Continued)

*Primary Examiner* — Ryan A Lubit
(74) *Attorney, Agent, or Firm* — Sughrue Mion, PLLC

(57) ABSTRACT

A display apparatus is provided. The display apparatus includes: a display panel unit which comprises a first panel region corresponding to an opaque display region, and a second panel region corresponding to a transparent display region, a panel driving unit which drives the first panel region and the second panel region independently, and a controller which controls to display a main image on the opaque display region and display an additional image on the transparent display region.

11 Claims, 23 Drawing Sheets

(51) Int. Cl.
*G06F 3/0481* (2013.01)
*G06F 3/0488* (2013.01)
*G06F 3/14* (2006.01)

(52) U.S. Cl.
CPC .......... *G06F 1/1637* (2013.01); *G06F 1/1647* (2013.01); *G06F 3/0481* (2013.01); *G06F 3/04886* (2013.01); *G06F 3/1423* (2013.01); *G06F 3/1431* (2013.01); *G06F 2200/1612* (2013.01); *G06F 2203/04803* (2013.01); *G09G 2300/023* (2013.01)

(56) References Cited

U.S. PATENT DOCUMENTS

| | | | |
|---|---|---|---|
| 9,219,875 B2 | 12/2015 | Lee | |
| 2004/0080482 A1* | 4/2004 | Magendanz | G06F 3/1431 345/100 |
| 2004/0150581 A1 | 8/2004 | Westerinen et al. | |
| 2005/0052341 A1 | 3/2005 | Henriksson | |
| 2005/0140576 A1* | 6/2005 | Sawada | G09G 3/344 345/30 |
| 2008/0235749 A1 | 9/2008 | Jain et al. | |
| 2008/0238828 A1* | 10/2008 | Nakayama | G09F 9/35 345/76 |
| 2009/0009527 A1 | 1/2009 | Kuga et al. | |
| 2009/0121985 A1* | 5/2009 | Kang | G09G 3/3233 345/82 |
| 2009/0135090 A1* | 5/2009 | Kim | G09G 3/003 345/6 |
| 2009/0289874 A1 | 11/2009 | Ha | |
| 2009/0315822 A1* | 12/2009 | Biebel | B60K 35/00 345/102 |
| 2010/0060587 A1 | 3/2010 | Freund | |
| 2010/0123732 A1* | 5/2010 | Jenks | G06F 3/1446 345/592 |
| 2010/0128020 A1* | 5/2010 | Oh | G06F 3/1446 345/213 |
| 2010/0141689 A1* | 6/2010 | Johnson | G06F 1/1647 345/690 |
| 2010/0156916 A1 | 6/2010 | Muikaichi et al. | |
| 2011/0018849 A1 | 1/2011 | Lowe et al. | |
| 2011/0058113 A1* | 3/2011 | Threlkel | E06B 9/24 349/1 |
| 2011/0109657 A1* | 5/2011 | Ogita | G02F 1/1334 345/690 |
| 2011/0113445 A1* | 5/2011 | Lee | 725/37 |
| 2011/0124376 A1 | 5/2011 | Kim et al. | |
| 2011/0164065 A1* | 7/2011 | Mate | G06F 3/1446 345/676 |
| 2011/0175902 A1* | 7/2011 | Mahowald | H04N 13/0495 345/419 |
| 2011/0227810 A1* | 9/2011 | McKinney | G06F 1/1626 345/1.3 |
| 2012/0327104 A1* | 12/2012 | Schrauben | G06F 3/04812 345/619 |

FOREIGN PATENT DOCUMENTS

| | | |
|---|---|---|
| CN | 102096446 A | 6/2011 |
| CN | 102164254 A | 8/2011 |
| EP | 2 129 085 A1 | 12/2009 |
| EP | 2 178 272 A2 | 4/2010 |
| JP | 2000-347184 A | 12/2000 |
| JP | 2004-359051 A | 12/2004 |
| JP | 2006-133346 A | 5/2006 |
| JP | 2006-259506 A | 9/2006 |
| JP | 2008-83510 A | 4/2008 |
| KR | 10-2009-0035667 A | 4/2009 |
| WO | 0076210 A1 | 12/2000 |
| WO | 2005/088594 A1 | 9/2005 |
| WO | 2006/098140 A1 | 9/2006 |
| WO | 2011/116346 A1 | 9/2011 |

OTHER PUBLICATIONS

Written Opinion dated Jun. 21, 2013, issued by the International Searching Authority in counterpart International Application No. PCT/KR2013/001047.
Communication from the European Patent Office dated Jan. 28, 2015 in a counterpart European Application No. 13154414.0.
Communication dated Mar. 16, 2016 issued by the State Intellectual Property Office of P.R. China in counterpart Chinese Patent Application No. 201310049330.5.
Communication dated Nov. 21, 2016 issued by Japanese Intellectual Property Office in counterpart Japanese Application No. 2013-023048.
Communication dated Dec. 6, 2016 issued by the State Intellectual Property Office of P.R. China in counterpart Chinese Application No. 201310049330.5.
Communication dated Jul. 31, 2017, issued by the Japanese Patent Office in counterpart Japanese Patent Application No. 2013-023048.
Communication dated May 25, 2017, issued by the State Intellectual Property Office of P.R. China in counterpart Chinese Patent Application No. 201310049330.5.
Notice of Decision of Rejection issued by the Japanese Office Action in counterpart Japanese Patent Application No. 2013-023048 dated Mar. 19, 2018 English Translation.
Communication dated Apr. 24, 2018 issued by the European Patent Office in counterpart European Patent Application No. 13154414.0.

* cited by examiner

DISPLAY APPARATUS FOR DISPLAYING ADDITIONAL INFORMATION ON TRANSPARENT DISPLAY REGION

CROSS-REFERENCE TO RELATED APPLICATION

This application claims priority from Korean Patent Application No. 10-2012-0141968, filed on Dec. 7, 2012 in the Korean Intellectual Property Office, and U.S. Provisional Patent Application No. 61/596,634 filed on Feb. 8, 2012 in the United States Patent and Trademark Office, the disclosures of which are incorporated herein by reference in their entirety.

BACKGROUND

1. Field

Methods and apparatuses consistent with exemplary embodiments relate to a display apparatus, and more particularly, to a display apparatus which can display an additional image.

2. Description of the Related Art

With the development of digital technologies, various kinds of electronic products have been developed and distributed. In particular, various types of display apparatuses such as televisions (TVs), mobile phones, a personal computers (PCs), notebook PCs, and personal digital assistants (PDAs) are being widely used in general households.

As display apparatuses are increasingly used, users' needs for more diverse functions increase. Accordingly, manufacturers of the display apparatuses make every effort to meet users' needs by providing products equipped with new functions that have not been previously provided, such as a function of providing a three-dimensional (3D) content.

In particular, the manufacturers develop a display apparatus which can provide various contents such as the Internet, a social network service (SNS), games, a video chat, and widgets, in addition to simple images. However, if such various contents are displayed on a display screen, the contents may hinder a viewer from concentrating on watching the image. Also, the user may have difficulty in using the display apparatus since the user is not accustomed to controlling the display apparatus.

Therefore, there is a demand for providing various contents simultaneously without hindering a user from watching an image, and allowing a user to control a display apparatus easily and intuitively.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus which can provide various contents according to user's request and purpose and can guide an appropriate user command according to a situation.

According to an aspect of an exemplary embodiment, there is provided a display apparatus including: a display panel unit which includes a first panel region corresponding to an opaque display region, and a second panel region corresponding to a transparent display region; a panel driving unit which drives the first panel region and the second panel region independently; and a controller which controls to display a main image on the opaque display region and display an additional image on the transparent display region.

The first panel region may be a center region of the display panel unit and the second panel region may be a border region except for the center region.

The panel driving unit may include: a first panel driving unit which drives the first panel region; and a second panel driving unit which drives the second panel region.

The display apparatus may further include: a first signal processor which signal processes the main image and provides the main image to the first panel region; and a second signal processor which signal processes the additional image and provides the additional image to the second panel region.

The additional image may include at least one of a pre-set widget, a pre-set icon, pre-set graphic effects, an image regarding the main image, additional information regarding the main image, and graphic effects regarding the main image.

The display panel unit may include: a first panel unit; and a second panel unit which is disposed on a border region of the first panel unit and adjusts transparency, and the first panel region may be a region that corresponds to the first panel unit and the second panel region may be a region of the second panel unit that is transparently adjusted.

The display panel unit may include: a first panel unit; and a second panel unit which is disposed on a rear surface of the first panel unit and adjusts transparency, and the first panel region may be a region of the second panel unit that is opaquely adjusted and the second panel region may be a region of the second panel unit that is transparently adjusted.

BRIEF DESCRIPTION OF THE DRAWING

The above and/or other aspects will be more apparent by describing in detail exemplary embodiments, with reference to the accompanying drawings, in which.

DETAILED DESCRIPTION OF EXEMPLARY EMBODIMENTS

Figure 1:
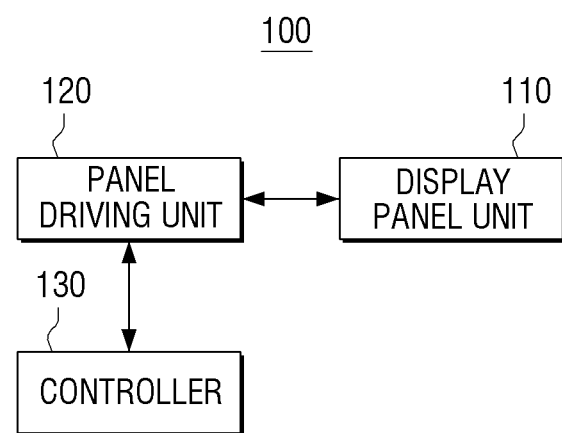
FIG. 1 is a block diagram illustrating a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a display apparatus according to an exemplary embodiment. Referring to FIG. 1, a display apparatus 100 includes a display panel unit 110, a panel driving unit 120, and a controller 130.

The display panel unit 110 is driven by the panel driving unit 120 and displays an image. The display panel unit 110 may include a first panel region which corresponds to an opaque display region, and a second panel region which corresponds to a transparent display region.

The panel driving unit 120 drives the display panel unit 110 under control of the controller 130. Specifically, the panel driving unit 120 may drive the first panel region and the second panel region of the display panel unit 110 independently.

The controller 130 controls overall operations of the display apparatus 100. In particular, the controller 130 controls the panel driving unit 120 to display an image on the display panel unit 110. Specifically, the controller 130 may control to display a main image on the opaque display region (the first panel region) and to display a main image or an additional image on the transparent display region (the second panel region).

Hereinafter, the display panel unit 110 and the panel driving unit 120 will be explained in detail with reference to FIGS. 2 to 7.

Figure 2:
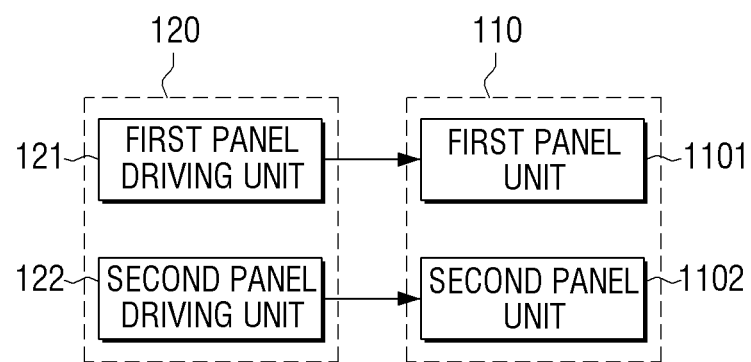
FIG. 2 is a block diagram illustrating a display panel unit and a panel driving unit in detail.

FIG. 2 is a block diagram illustrating the display panel unit and the panel driving unit in detail. Referring to FIG. 2, the display panel unit 110 may include a first panel unit 1101 and a second panel unit 1102. The first panel unit 1101 corresponds to an opaque display region and the second panel unit 1102 corresponds to a transparent display region.

The panel driving unit 120 includes a first panel driving unit 121 and a second panel driving unit 122. The first panel driving unit 121 drives the first panel unit 1101 and the second panel driving 122 drives the second panel unit 1102. Accordingly, one of the first panel unit 1101 and the second panel unit 1102 that does not display an image may be turned off and thus power consumption can be reduced. Although the panel driving unit 120 is realized by a plurality of panel driving units and drives the first panel unit 1101 and the second panel unit 1102 independently in FIG. 2, the panel driving unit 120 may be realized by a single panel driving unit which drives the first panel unit 1101 and the second panel unit 1102 independently.

Figure 3:
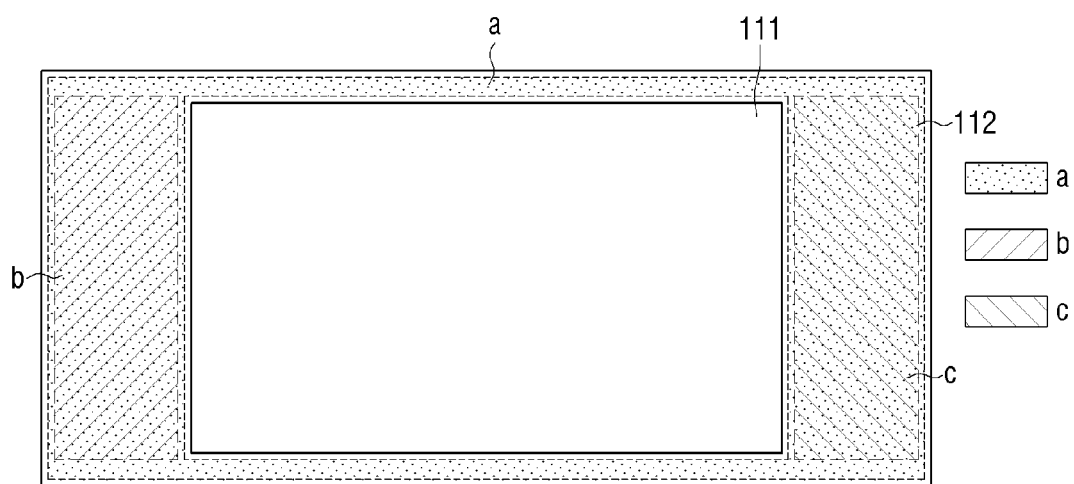
FIG. 3 is a view to explain a display panel unit according to an exemplary embodiment.

FIG. 3 is a view to explain the display panel unit according to an exemplary embodiment. Referring to FIG. 3, a first panel region 111 is a center region of the display panel unit 110, and a second panel region 112 is a border region except for the center region. However, this is merely an example and locations of the first panel region 111 and the second panel region 112 may be realized in various manners. The first panel region 111, which corresponds to an opaque display region, may display a main image. The second panel region 112, which corresponds to a transparent display region, may display a main image or an additional image. The additional image may include at least one of a pre-set widget, a pre-set icon, pre-set graphic effects, an image regarding a main image, additional information regarding a main image, and graphic effects regarding a main image.

A region (a) of the second panel region 112 displays a temporary service and function which are provided to a user while the user is watching a display screen. For example, if a user is invited to conduct a video chat by another user when the user is watching a content displayed on the first panel region 111, the region (a) provides a video chat service. If a new message is registered at a social network service (SNS), the region (a) informs that the new message is registered. Also, if the user watches a movie displayed on the first panel region 111, the region (a) provides subtitles or displays graphic effects regarding the movie that the user is watching.

A region (b) of the second panel region 112 displays additional information on a content or a user experience. For example, if the user is watching a soccer game displayed on the first panel region 111, the region (b) may display information on teams that participate in the soccer game, news on a soccer league, information on players participating in the soccer game, and/or information on goods such as a uniform and soccer shoes.

A region (c) of the second panel region 112 displays a content list for the user to easily access a desired content. The content list may include various contents such as an SNS, the Internet, and games as well as general broadcast channels.

As described above, the main image and the additional image are displayed on separate regions, so that a viewer can be provided with an original main image which is devoid of additional information included in the content and also can be provided with various additional images intuitively and easily.

Referring to FIG. 3, the region (a) physically overlaps with the regions (b) and (c). However, the regions (a), (b), and (c) may be separately operated according to a type of a content and a situation.

The first panel region 111 and the second panel region 112 of the display panel unit 110 may be realized in various ways according to exemplary embodiments. Hereinafter, detailed configurations of the first panel region 111 and the second panel region 112 will be explained according to exemplary embodiments.

According to a first exemplary embodiment, the display panel unit 110 includes the first panel unit 1101 which corresponds to the first panel (opaque display) region 111, and the second panel unit 1102 which corresponds to the second panel (transparent display) region 112. The first panel unit 1101 may be realized by a general liquid crystal display (LCD) panel or an organic light emitting diode (OLED) panel. The second panel unit 1102 may be realized by a transparent LCD panel or a transparent OLED panel. The transparent LCD panel refers to an LCD panel which is realized using a transparent electrode without a backlight unit, and the transparent OLED panel refers to an OLED panel that is realized using a transparent organic light emitting layer and a transparent electrode. If the first panel unit and the second panel unit are realized by the same type of panel, the display panel unit 110 may be embodied by a physically single panel.

According to a second exemplary embodiment, the display panel unit 110 includes the first panel unit 1101 which corresponds to the first (opaque) panel region 111 and the second panel unit 1102 which corresponds to the second (transparent) panel region 112 and can adjust transparency. The first panel unit 1101 may be realized by a general LCD panel or an OLED panel as in the first exemplary embodiment. The second panel unit 1102 may be realized using two panels in order to adjust transparency. The second panel unit 1102 will be explained in detail with reference to FIGS. 4A, 4B and 5.

Figure 4A:
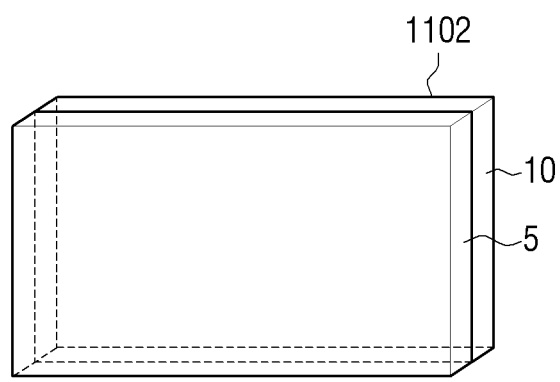
FIGS. 4A to 5 are views to explain a second panel unit which can adjust transparency in detail.
Figure 4B:
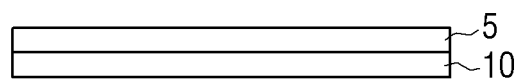
Figure 5:
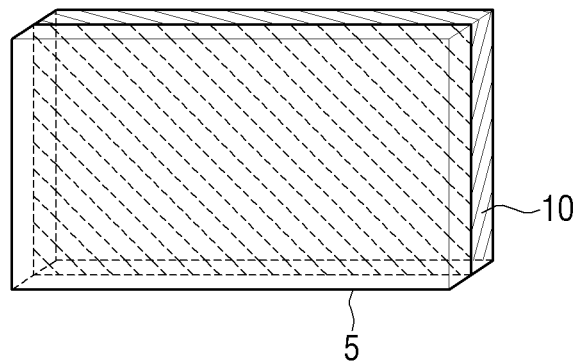

FIGS. 4A, 4B and 5 are views to explain the second panel unit 1102 which can adjust transparency in detail. Referring to FIGS. 4A and 4B, the second panel unit 1102 includes a first panel 5 and a second panel 10. The first panel 5 is a panel to display an image and may be realized by a transparent LCD panel or a transparent OLED panel. The second panel 10 is a panel to adjust transparency of the second panel unit, and is disposed on a rear surface of the first panel 5 and may be realized by a transparent LCD panel or an electronic wetting display (EWD) panel. The second panel 10 may adjust the transparency from a transparent state to a black opaque state. The second panel 10 is a panel to adjust the transparency and thus is not required to realize colors and may not have a color filter. FIG. 5 illustrates the second panel unit if the second panel 10 is adjusted to be in the opaque state. If the first panel unit 1101 and the first panel 5 of the second panel unit 1102 are realized by the same type of panel, the first panel unit 1101 and the first panel 5 of the second panel unit 1102 may be embodied by a single panel.

Figure 6A:
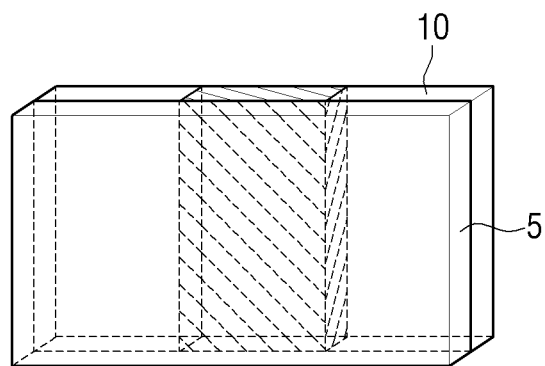
FIGS. 6A and 6B are views to explain a second panel which can adjust transparency according to a region.
Figure 6B:
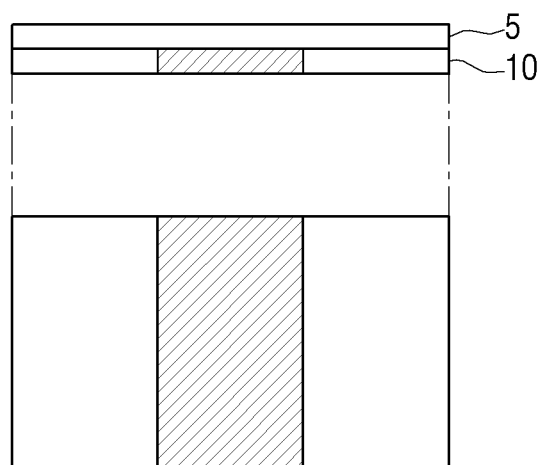

FIGS. 6A and 6B are views to explain the second panel unit 1102 which can adjust transparency according to a region. As shown in FIGS. 6A and 6B, the second panel unit 1102 may adjust the transparency differently according to a region. Specifically, the second panel 10 of the second panel unit 1102, which adjusts the transparency, may be independently driven on a pixel basis or a pixel group basis including a plurality of pixels to adjust the transparency differently according to a region.

Figure 7:
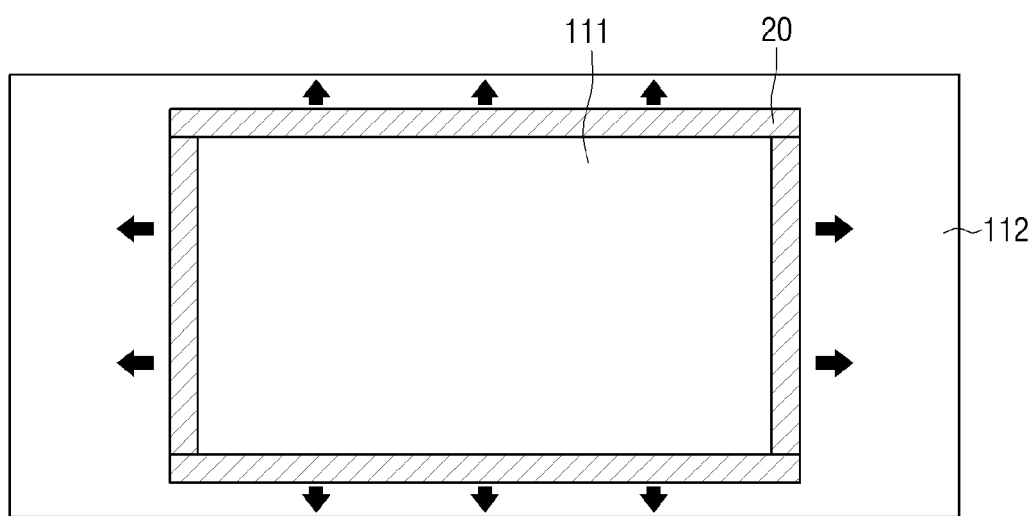
FIG. 7 is a view to explain a method for providing backlight to a second panel region.

FIG. 7 is a view to explain a method for providing backlight to the second panel region 112. If the first panel unit 1101 corresponding to the first panel region 111 is realized by an LCD panel and the first panel 5 of the second panel unit 1102 corresponding to the second panel region 112 is realized by a transparent LCD panel, a backlight unit 20 of the first panel unit 1101 may be realized by an edge type and the backlight unit 20 of the edge type may be designed to also provide backlight to the first panel 5 of the second panel unit 1102. Accordingly, even if the second panel 10 of the second panel unit 1102 is in the opaque state, the backlight unit may provide backlight to the first panel 5 of the second panel unit 1102.

According to a third exemplary embodiment, an entire region of the display panel unit 110 may be realized by a panel that can adjust transparency. That is, the display panel unit 110 may include the first panel 5 to display an image and the second panel 10 which is disposed on the rear surface of the first panel 5 to adjust transparency of the display panel unit 110. Unlike in the second exemplary embodiment, the second panel 10 is disposed on an entire region of the display panel unit 110. The second panel 10 may adjust the transparency differently according to a region of the second panel 10. The first panel region 111 of the display panel unit 110 may correspond to a region of the second panel 10 that is opaquely adjusted, and the second panel region 112 may correspond to a region of the second panel 10 that is transparently adjusted. For example, the second panel 10 may adjust the center region (first panel region) opaquely and may adjust the border region (second panel region) except for the center region transparently.

Figure 8:
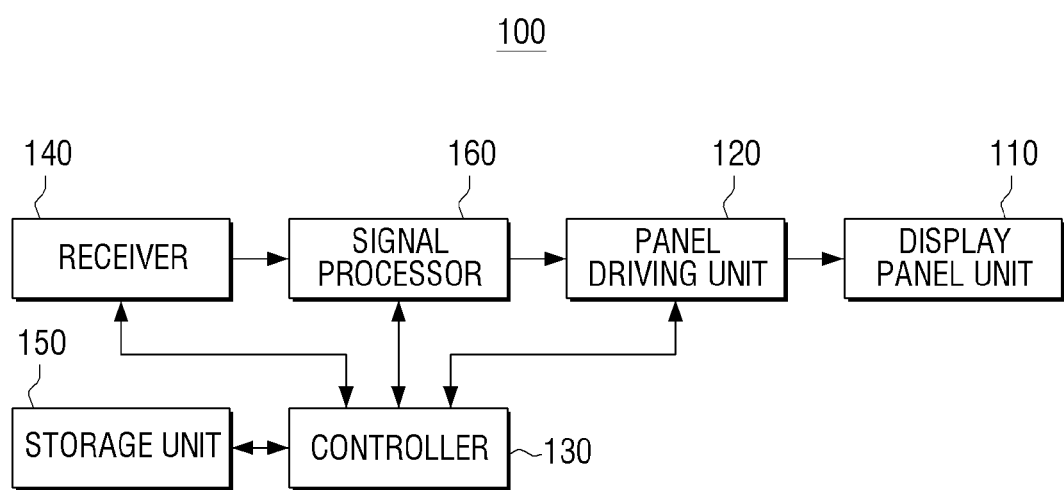
FIG. 8 is a block diagram illustrating a display apparatus according to another exemplary embodiment.

FIG. 8 is a block diagram illustrating a display apparatus according to another exemplary embodiment. The display apparatus 100 may further include a receiver 140, a storage unit 150, and a signal processor 160 as well as the display panel unit 110, the panel driving unit 120, and the controller 130.

The receiver 140 receives a content. Specifically, the receiver 140 may receive a content using a broadcasting network or the Internet. Also, the receiver 140 may receive a content from various types of recording medium reproducing apparatuses which are provided in the display apparatus 100 or connected to the display apparatus 100. The recording medium reproducing apparatus refers to an apparatus that reproduces a content which is stored in various types of recording media such as a CD, a DVD, a hard disk, a blue-ray disk, a memory card, and a USB memory.

The storage unit 150 stores various applications, contents, and graphic effects which may be executed, reproduced, or displayed by the display apparatus 100.

The signal processor 160 performs signal processing with respect to a content which is received by the receiver 140 or stored in the storage unit 150. The signal processor 160 may include a de-multiplexer (not shown) to separate video data, audio data, and additional data from the content, and an image processor (not shown), an audio processor, and an additional data processor to process the data separated from the content by the de-multiplexer.

The signal processor 160 may process the images which are displayed on the first panel region and the second panel region independently. Specifically, if a main image and an additional image are included in the content or if an image to be displayed on the first panel region 111 and an image to be displayed on the second panel region 112 are received from different sources, the display apparatus 100 may include a plurality of image processors to process the images respectively. The image processor will be explained in detail with reference to FIG. 9.

Figure 9:
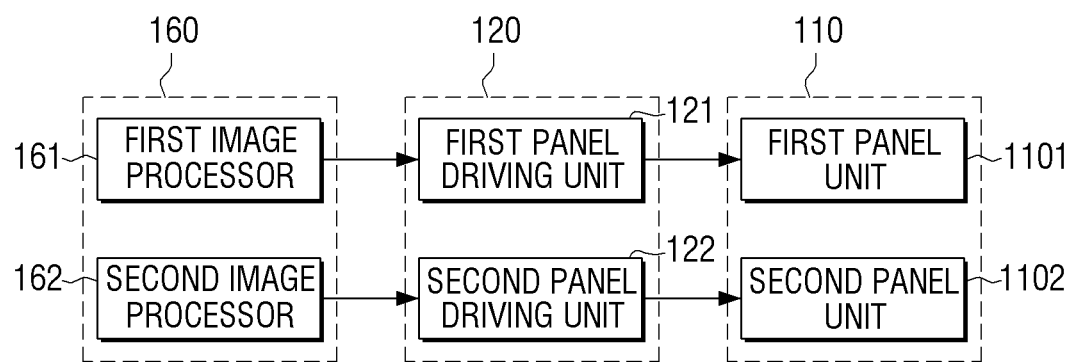
FIG. 9 is a block diagram to explain a signal processor in detail.

FIG. 9 is a block diagram illustrating the signal processor in detail. Referring to FIG. 9, the signal processor 160 includes a first image processor 161 and a second image processor 162. The first image processor 161 processes the main image. The first panel driving unit 121 may drive the first panel unit 1101 to display the image, which is processed by the first image processor 161, in the first panel region 111 under control of the controller 130. The second panel driving unit 122 may drive the second panel unit 1102 to display the image, which is processed by the second image processor 161, in the second panel region 112 under control of the controller 130. After the additional data included in the content such as subtitles is processed by the additional data processor, the additional data is rendered with the image which is processed by the second image processor 161 and is displayed on the second panel region 112.

The signal processor 160 may extract text and an image which are continuously included in the content and may display the text and the image on the second panel region. For example, the signal processor 160 may separate a score which is repeatedly displayed on each frame of a soccer game image or a logo indicating each broadcast channel from the main image, and may display the score or the logo on the second panel region.

Figure 10A:
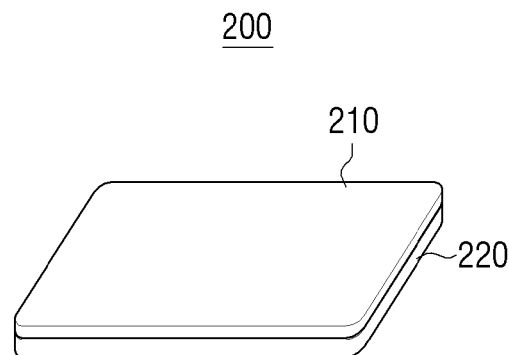
FIGS. 10A to 10C are views illustrating a remote controller according to an exemplary embodiment.
Figure 10B:
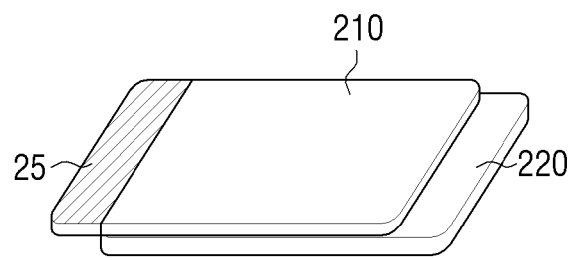
Figure 10C:
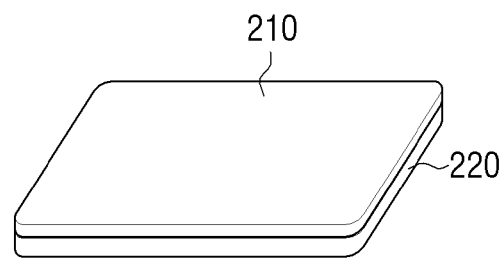

FIGS. 10A to 10C are views illustrating a remote controller according to an exemplary embodiment. Referring to FIG. 10A, a remote controller 200 includes a first layer 210 and a second layer 220 which is disposed on a lower portion of the first layer 210. A front surface of the first layer 210 may be realized by an input apparatus such as a touch pad or may be realized by a touch screen to display an image. The first layer 210 is disposed on the second layer 220 to be movable horizontally by a predetermined distance with respect to the second layer 220. The operation of moving the first layer 210 to the left of the second layer 220 may correspond to the operation of controlling the region (b) of the second panel region of FIG. 3 or displaying a corresponding content, and the operation of moving the first layer 210 to the right of the second layer 220 may correspond to the operation of controlling the region (c) of the second panel region or displaying a corresponding content. For example, if the user moves the first layer 220 of the remote controller 200 to the right, a content list may be displayed on the region (c) of the second panel region.

FIG. 10B illustrates the first layer 210 which is moved to the left of the second layer 220 by a predetermined distance. A region 25 in which the first layer 210 does not coincide with the second layer 220 due to the movement of the first layer 210 may be used as a region to control the region (b) of the second panel region. The user may control the content displayed on the region (b) of the second panel region by touching the region 26 of the first layer.

FIG. 10C illustrates the first layer 210 which is moved back to the original position and completely coincides with the second layer 220. As the first layer 210 is moved to the original position, the image displayed on the region (b) of the second panel region may disappear.

Figure 11:
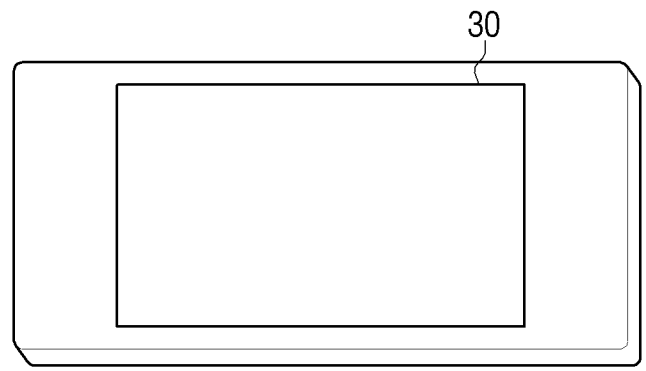
FIG. 11 is a view illustrating a remote controller according to another exemplary embodiment.

FIG. 11 is a view illustrating a remote controller according to another exemplary embodiment. Referring to FIG. 11, a front surface of the remote controller 200 may be realized in a similar shape to that of the display panel unit 110 of the display apparatus 100.

The front surface of the remote controller 200 may be realized by a touch pad or a touch screen as shown in FIG. 10A to 10C. The user may control the region (b) or (c) of the second panel region or display a corresponding content by outwardly dragging on a border 30 displayed on the front surface of the remote controller 200.

If the remote controller 200 shown in FIGS. 10A to 11 is realized by a touch screen, the remote controller 200 may display an object to guide appropriate user input according to a situation or may receive a content displayed on the display apparatus 100 and may display the content.

Hereinafter, various scenarios which can be applied to the display apparatus 100 according to an exemplary embodiment will be explained. FIGS. 12A to 21 are views to explain various images, contents, and information that can be displayed on the display apparatus according to an exemplary embodiment.

Figure 12A:
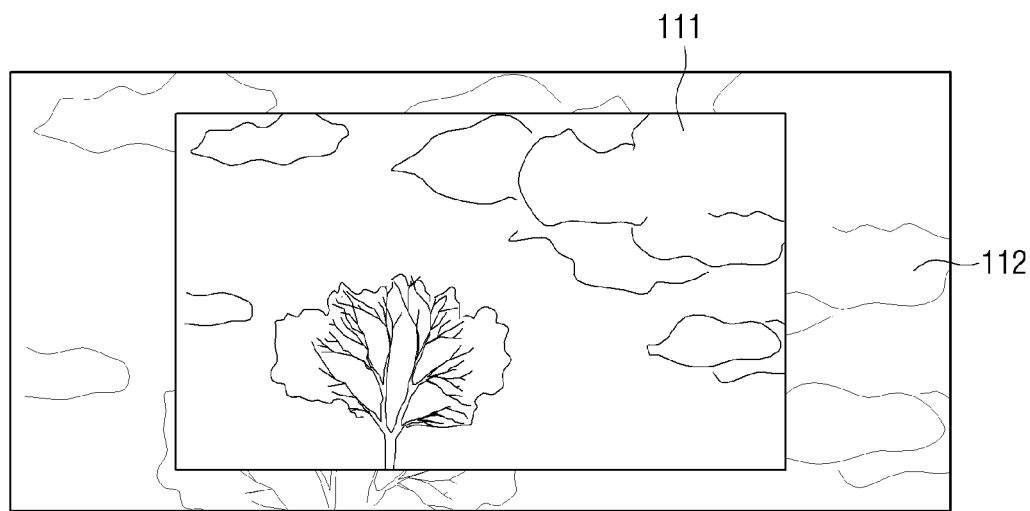
FIGS. 12A and 12B are views to explain an operation of displaying graphic effects regarding a main image on a second panel region.
Figure 12B:
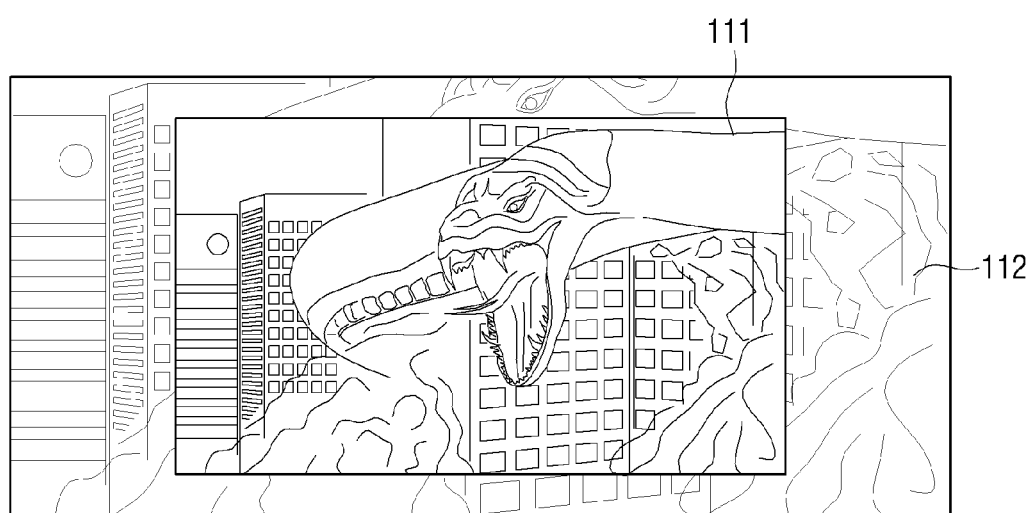

FIGS. 12A and 12B are views to explain an operation of displaying graphic effects regarding a main image on the second panel region. The display apparatus 100 displays a main image on the first panel region 111 and may display graphic effects regarding the main image on the second panel region 112. Referring to FIG. 12A, a main image including a tree and clouds may be displayed on the first panel region 111. Graphic effects similar to the tree and the clouds included in the main image may be displayed on the second panel region 112. Referring to FIG. 12B, a scene of fire-breathing monster and burning buildings may be displayed on the first panel region 111, and graphic effects similar to the fire included in the main image may be displayed on the second panel region 112. Also, if a scene where an airplane is controlled is displayed on the first panel region 111, graphic effects which make a user feel the sensation of speed may be displayed on the second panel region 112. If a scene where the wave is crashing is displayed on the first panel region 111, graphic effects similar to the wave may be displayed on the second panel region 112. As described above, the second panel region 112 displays the graphic effects regarding the main image so that the user can concentrate on the main image.

Figure 13A:
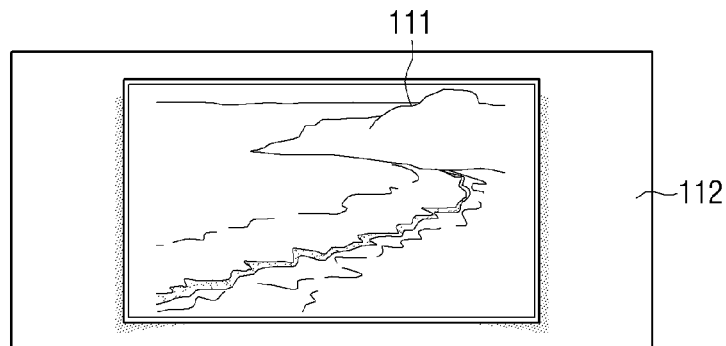
FIGS. 13A to 13D are views to explain an operation of displaying graphic effects on a second panel region.
Figure 13B:
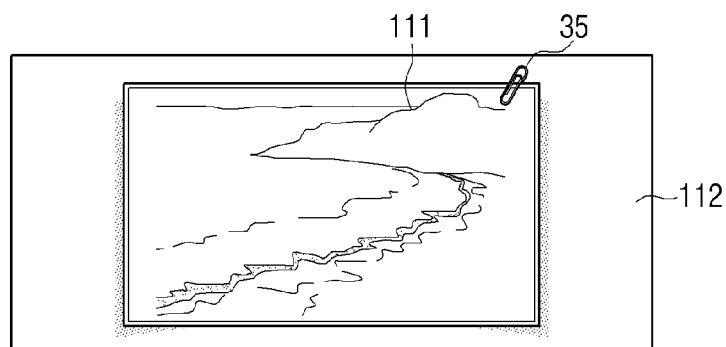
Figure 13C:
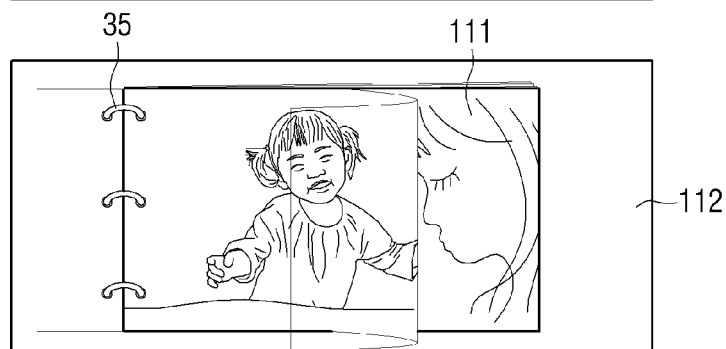
Figure 13D:
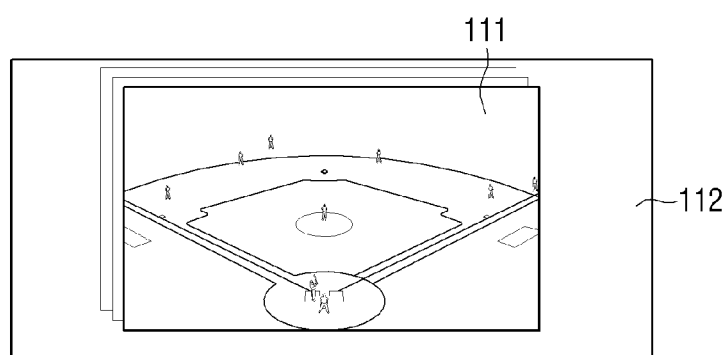

FIGS. 13A to 13D are views to explain an operation of displaying graphic effects on the second panel region. The display apparatus 100 displays a main image on the first panel region 111 and displays graphic effects on the second panel region 112, thereby providing special visual effects. Referring to FIGS. 13A to 13C, graphic effects may be displayed on the second panel region 112 so that the first panel region 111 can have visual effects like a photo or an album. Also, referring to FIGS. 13B and 13C, graphic effects 35 to make the first panel region 111 and the second panel region 112 look like connected with each other are displayed so that visual effects can be maximized. Referring to FIG. 13D, graphic effects to make a plurality of images look like overlapping may be displayed on the second panel region 112. The graphic effects are displayed on the second panel region as described above, so that special visual effect appropriate to a user's situation can be provided.

Figure 14:
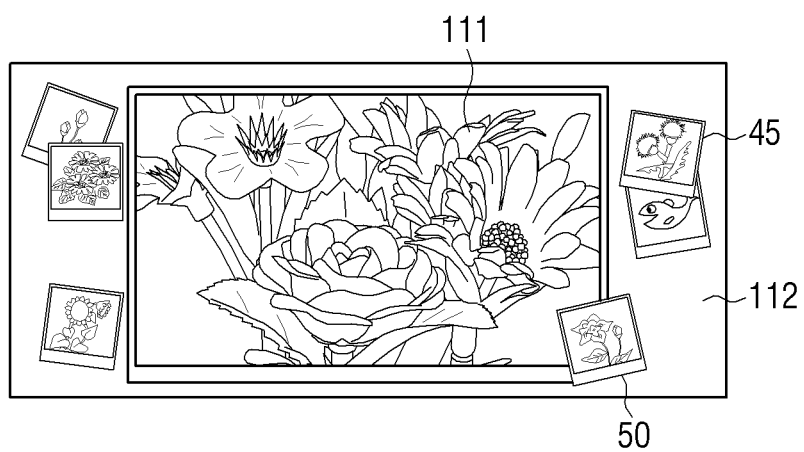
FIG. 14 is a view to explain an operation of displaying an image regarding a main image on a second panel region.

FIG. 14 is a view to explain an operation of displaying an image regarding a main image on the second panel region. The display apparatus 100 displays a main image on the first panel region 111 and displays various images regarding the main image on the second panel region 112. If the user enjoys a photo as shown in FIG. 14, one photo may be displayed on the first panel region 111 and the other photos 45 may be displayed on the second panel region 112. Also, a certain photo 50 may be displayed on both the first panel region 111 and the second panel region 112 as shown in FIGS. 13B and 13C. In the case of a moving image content including a plurality of images such as a multi-angle content, a main image may be displayed on the first panel region 111 and the other images may be displayed on the second panel region, so that various images can be provided simultaneously.

Figure 15A:
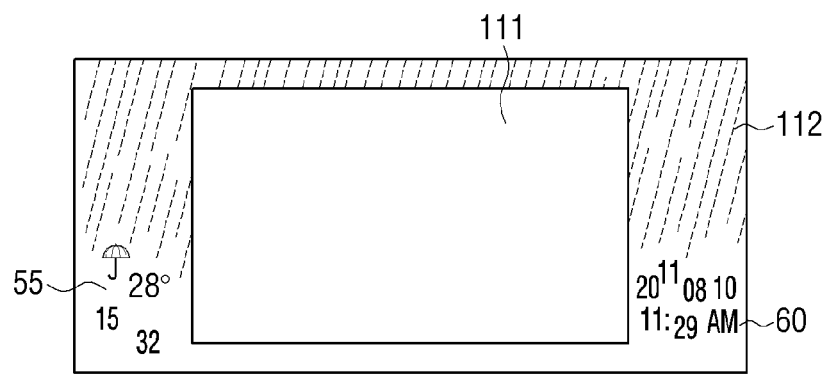
FIGS. 15A to 15C are views to explain an operation of displaying a pre-set widget or pre-set graphic effects on a second panel region.
Figure 15B:
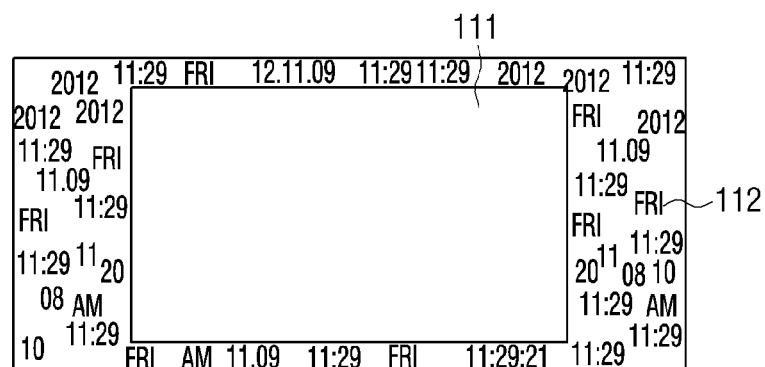
Figure 15C:
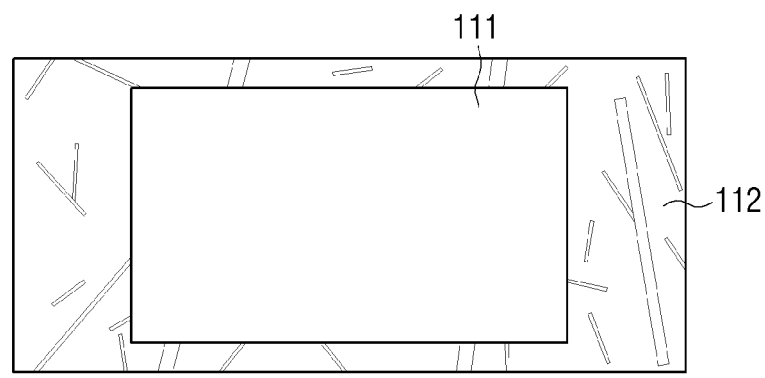

FIGS. 15A to 15C are views to explain an operation of displaying a pre-set widget or pre-set graphic effects on the second panel region. The display apparatus 100 may display a pre-set widget or pre-set graphic effects on the second panel region 112. Referring to FIG. 15A, a widget 55 which provides weather information and a widget 60 which provides date and time information may be displayed on the second panel region 112. Also, graphic effects corresponding to current weather may be displayed. Also, as shown in FIG. 15B, graphic effects displaying date and time information repeatedly may be provided. Also, by displaying pre-set graphic effects as shown in FIG. 15C, the display apparatus 100 may be utilized for room interior design or decoration. Since the widget or the graphic effects explained in FIGS. 15A to 15C have nothing to do with an image displayed on the first panel region 111, the widget or the graphic effects may be displayed independently even if the first panel region 111 is turned off.

Figure 16:
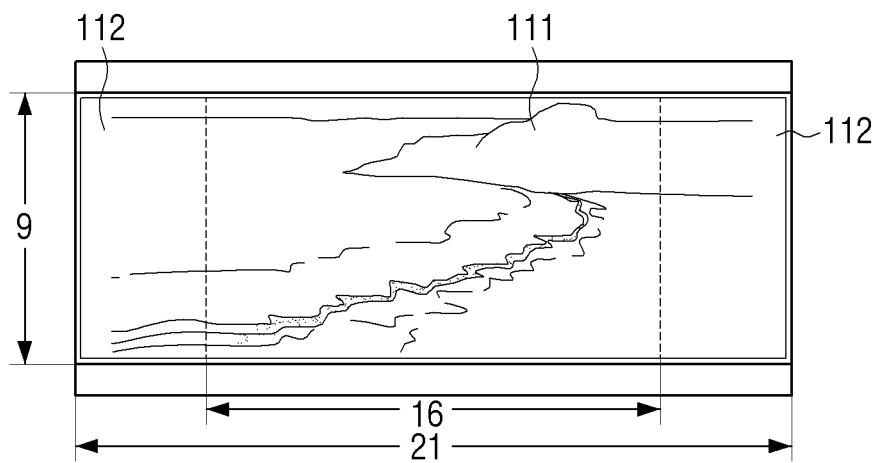
FIG. 16 is a view to explain an operation of displaying a part of a main image on a second panel region.

FIG. 16 is a view to explain an operation of displaying a part of a main image on the second panel region. If an aspect ratio applied to the main image is different from an aspect ratio supported by the first panel region 111, the display apparatus 100 may display a part of the main image that is not displayed on the first panel region 111 on the second panel region 112. If the main image has an aspect ratio of 21:9 and the first panel region has an aspect ratio of 16:9, 16/21 of the main image may be displayed on the first panel region 111 and the remainder of the main image, 5/21, may be displayed on the second panel region 112. If a part of the main image is displayed on the second panel region as described above, the second panel region may be adjusted to be opaque like the first panel region.

Figure 17:
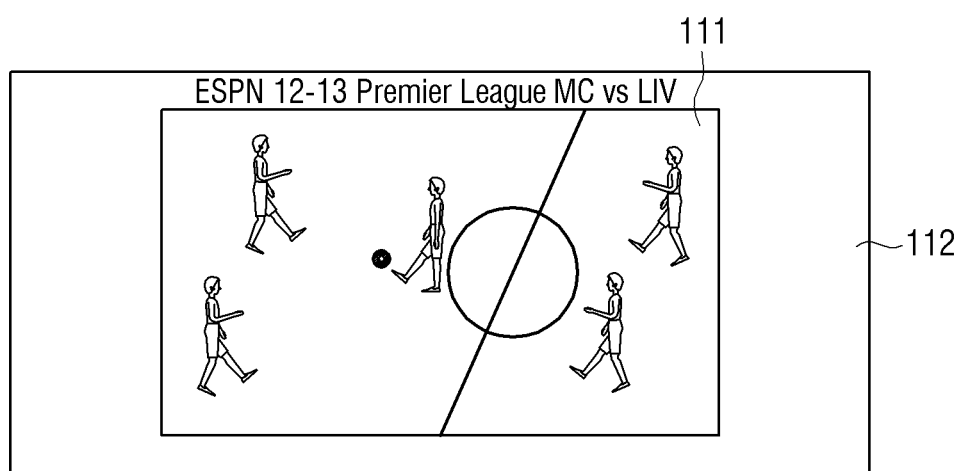
FIGS. 17 to 19 are views to explain an operation of displaying additional information regarding a main image on a second panel region.
Figure 18:
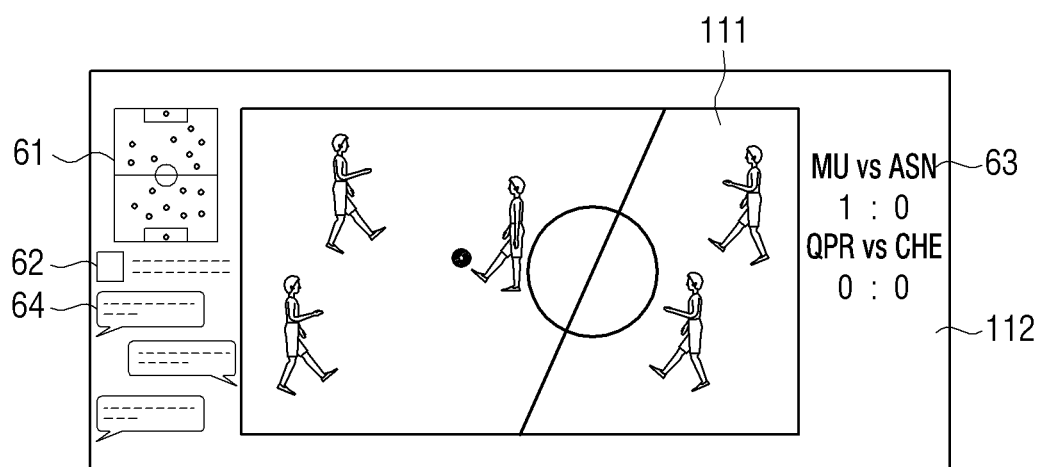
Figure 19:
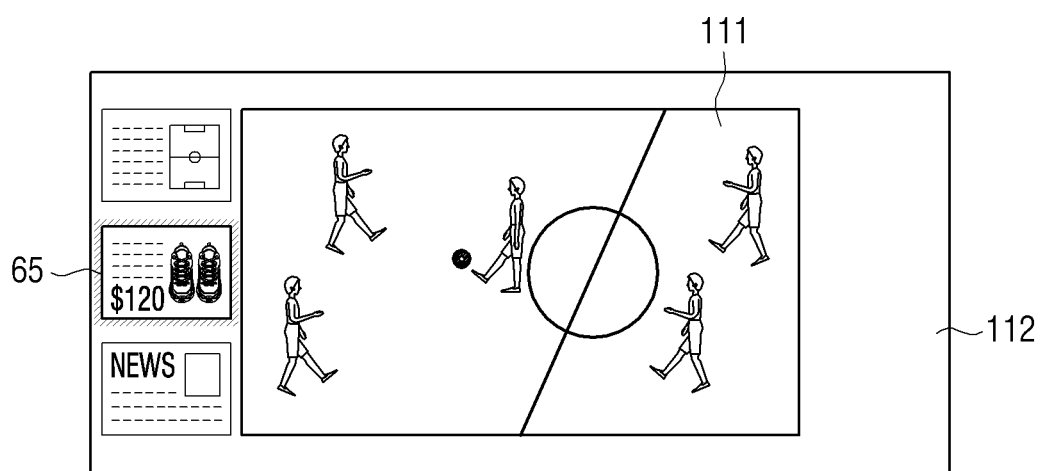

FIGS. 17 to 19 are views to explain an operation of displaying additional information regarding a main image on the second panel region. The additional information regarding the main image may include all pieces of information on the main image, such as information on a broadcasting station, a broadcast program title, broadcasting hours and elapsed time of a main image, a producer of a main image, cast information, information on props appearing in a main image, an advertisement regarding a main image, and news on a main image.

Referring to FIG. 17, information on a broadcasting station of a displayed broadcast program and a title of the broadcast program may be displayed on the second panel region 112. If a soccer game is relayed as shown in FIG. 17, a name of a broadcasting station which relays the soccer game, a name of a soccer league and names of teams which participate in the soccer game may be displayed on the second pane region. Also, total broadcasting hours and elapsed time of the displayed broadcast program may be displayed as texts or images. The broadcasting station information and the title of the broadcast program may be displayed on an upper portion of the first panel region 111 in the second panel region 112.

Referring to FIG. 18, information on the broadcast program itself may be displayed on the second panel region 112. If the soccer game is relayed as shown in FIG. 18, position information of players in the stadium 61, information on a photo and a profile of a certain player 62, and a score of another soccer game in the league 63 may be displayed on the second panel region. Also, an on-line chat service 64 or a video chat service for chatting with friends who are watching the same game may be provided through the second panel region.

Referring to FIG. 19, additional information regarding the displayed main image may be displayed on the second panel region 112 in a form of an object or an icon. The user may scroll or select an object or an icon displayed on the second panel region 112 using the remote controller 200, and highlight 65 may be displayed on one of the plurality of objects (or icons) according to a user command or may be changed. If the user selects the object or icon where the highlight is displayed, detailed information on the selected object or icon may be displayed on the first panel region 111 or the second panel region 112.

Figure 20:
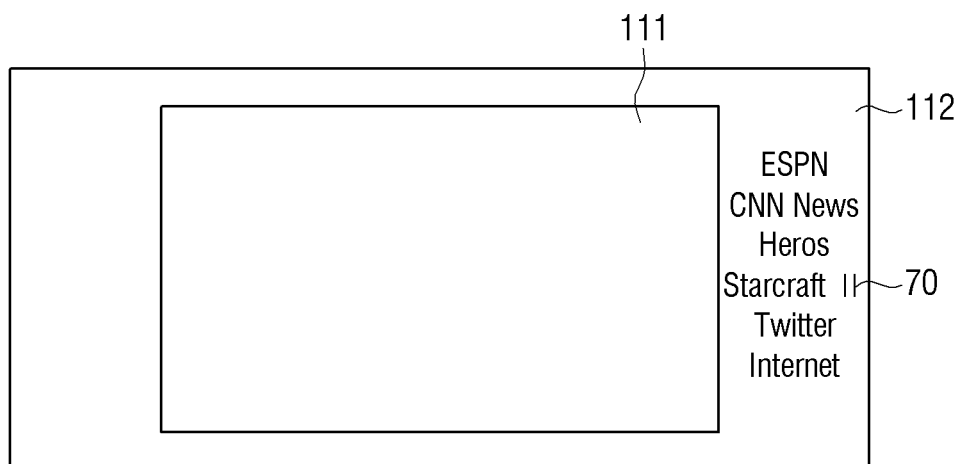
FIGS. 20 and 21 are views to explain an operation of displaying a content list on a second panel region.
Figure 21:
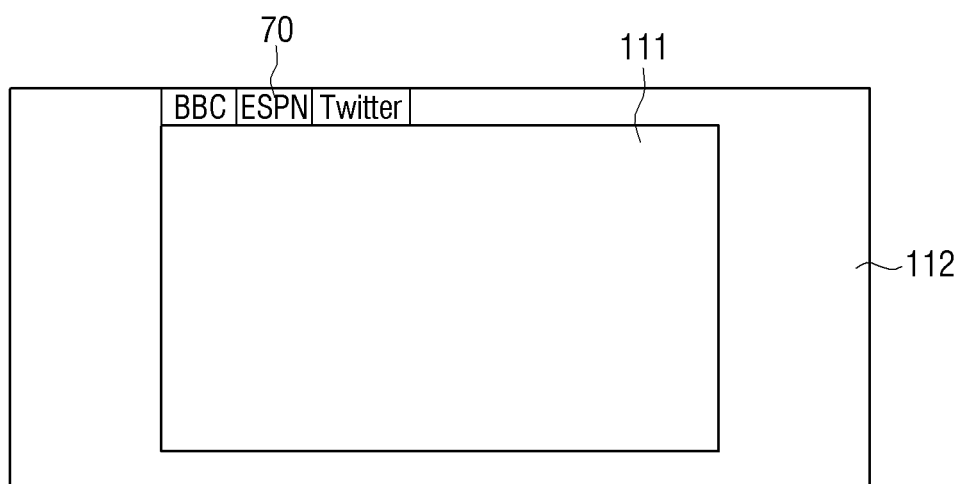

FIGS. 20 and 21 are views to explain an operation of displaying a content list on the second panel region. Referring to FIG. 20, a content list 70 including various contents such as sports, news, drama, games, SNS, and the Internet may be displayed on the second panel region 112. In particular, the content list may be displayed on the region (c) of the second panel region, and the user may scroll the content list or select one of the plurality of contents using the remote controller 200. Highlighting may be displayed on one of the plurality of contents or may be changed according to a user command. Referring to FIG. 21, the content list 70 may be displayed on an upper portion of the first panel region 111 in the second panel region 112.

Figure 22A:
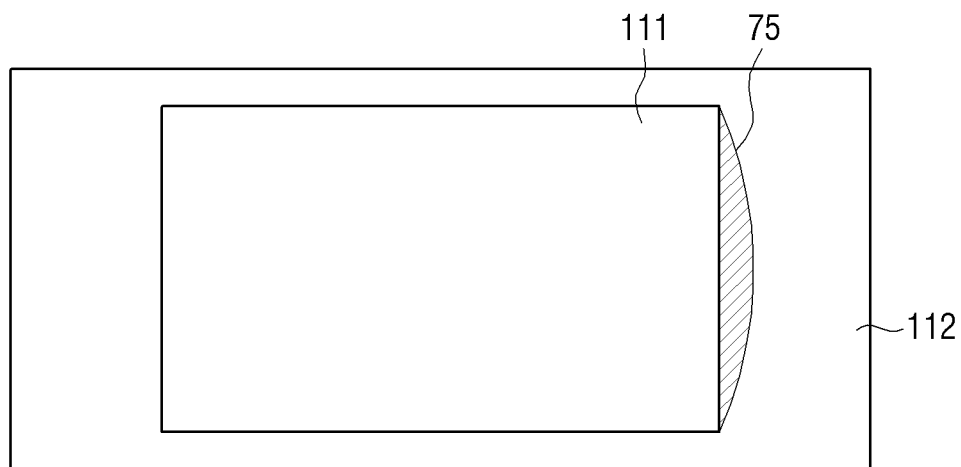
FIGS. 22A to 23B are views to explain an operation of displaying additional information on regions (b) and (c) of a second panel region in detail.
Figure 22B:
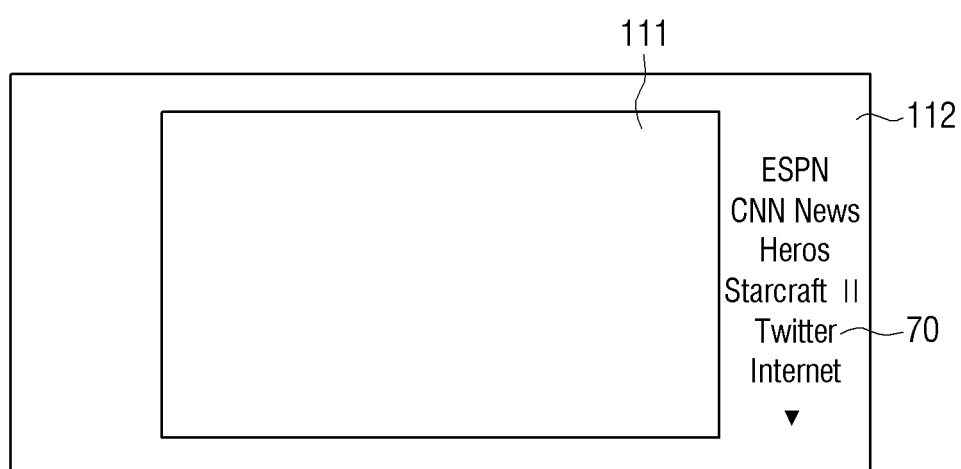
Figure 23A:
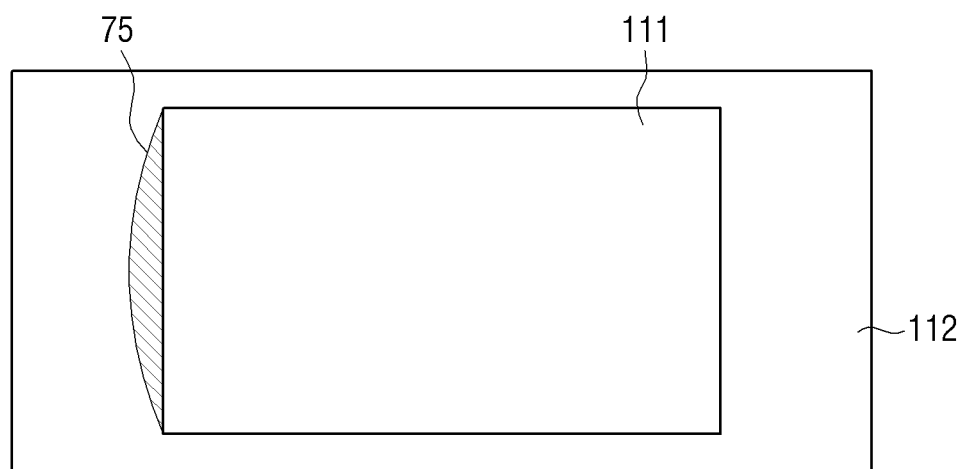
Figure 23B:
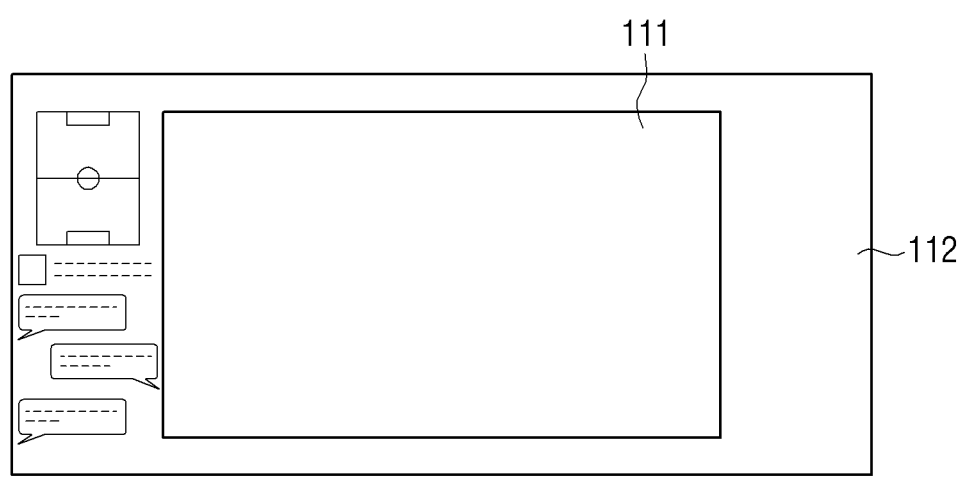

FIGS. 22A to 23B are views to explain an operation of displaying additional information on the regions (b) and (c) of the second panel region in detail. The display apparatus 100 generally displays only the region (a) of the second panel region and may display the region (b) or (c) if necessary. Specifically, if there is information to be displayed on the region (b) or (c) of the second panel region, highlight 75 is displayed on a boundary region between the first panel region 111 and the region (b) or (c) of the second panel region, informing the user that there is information to be displayed, as shown in FIG. 22A or 23A. If the user inputs a user command to display information on the region (b) or (c) (for example, the user slides the first layer 210 of the remote controller 200 as shown in FIG. 10B) through the remote controller 200, the additional information may be displayed on the second region as shown in FIG. 22B or 23B.

Figure 24A:
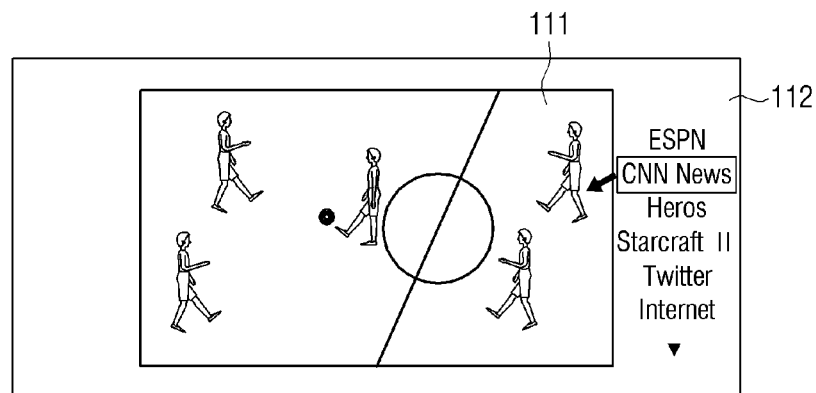
FIGS. 24A to 24E are views to explain an operation of changing a main image displayed on a first panel region to a different content.
Figure 24B:
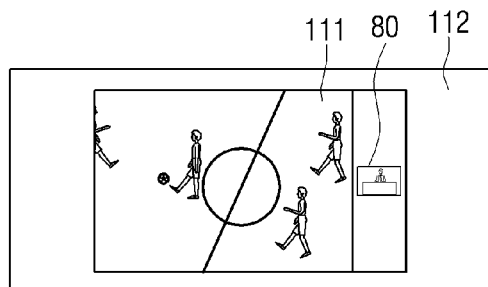
Figure 24C:
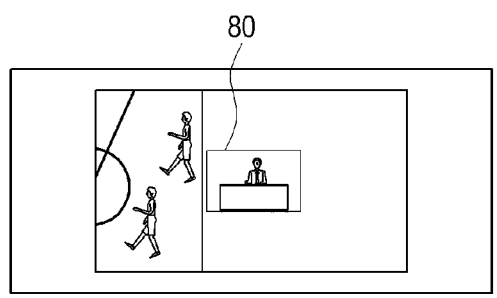
Figure 24D:
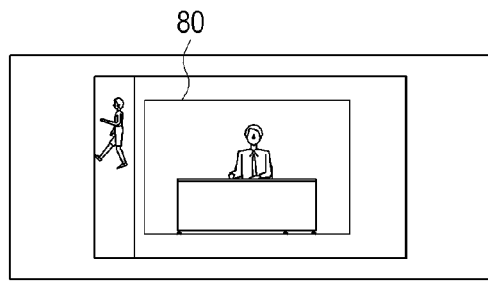
Figure 24E:
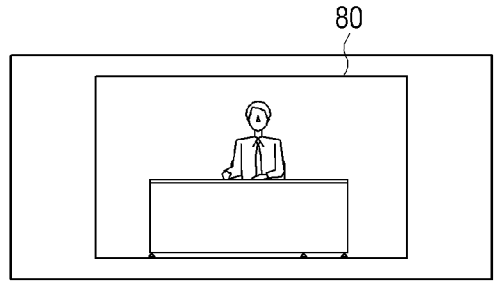

FIGS. 24A to 24E are views to explain an operation of changing a main image displayed on the first panel region to a different content. The main image displayed on the first panel region may be changed by a continuous operation. FIG. 24A illustrates a situation in which a content list is displayed on the second panel region as in FIG. 20. The user may scroll the content list or may select one of the plurality of contents using the remote controller 200. If the user selects "CNN News" from among the plurality of contents, "CNN News" is moved to the left of the first panel region 111 on which the main image is displayed and a CNN News image 80 is displayed as shown in FIG. 24B. Accordingly, the soccer game image displayed on the first panel region 111 is pushed out to the left. After that, the CNN News image 80 gets larger and is moved to the center of the first panel region 111 and accordingly the soccer game image is gradually pushed out to the left as shown in FIGS. 24C and 24D. Finally, if the CNN News image 80 is enlarged to fit in the first panel region 111 and the soccer game image disappears from the display screen, the main image displayed on the first panel region is changed from the soccer game image to the CNN News image. The operation of changing the main image described with reference to FIGS. 24A to 24E is merely an example, and the main image may be changed in various methods.

Figure 25A:
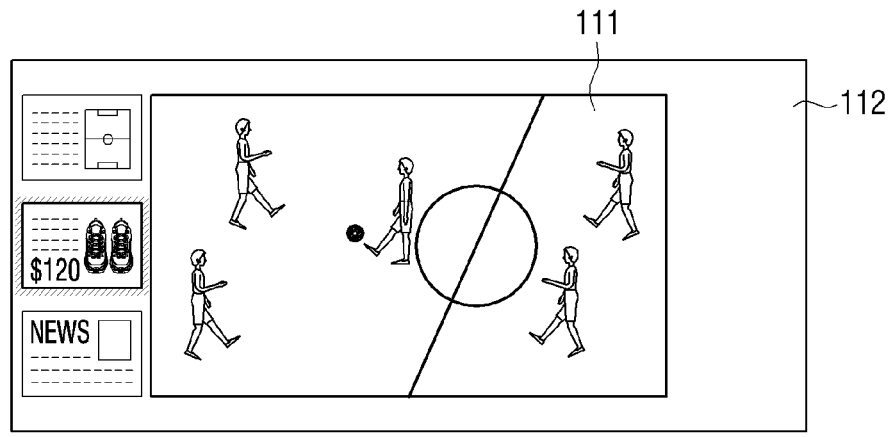
FIGS. 25A to 25C are views to explain an operation of changing a main image displayed on a first panel region to additional information regarding the main image.
Figure 25B:
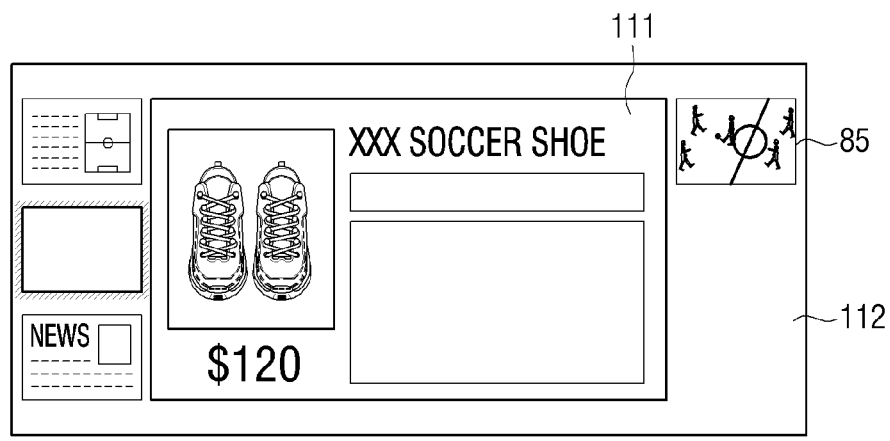
Figure 25C:
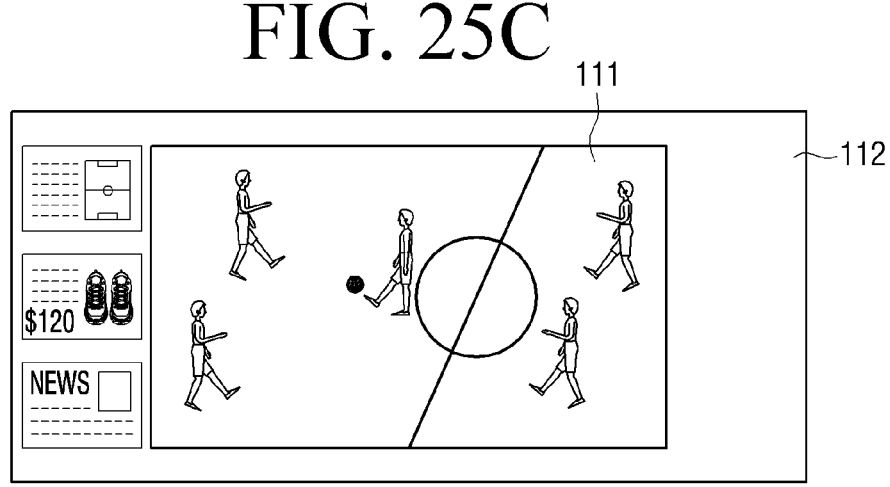

FIGS. 25A to 25C are views to explain an operation of changing a main image displayed on the first panel region to additional information regarding the main image. FIG. 25A illustrates a situation in which additional information regarding the main image is displayed on the second panel region in a form of one or more objects (or icon(s)) as in FIG. 19. The user may select one of the objects using the remote controller 200, and, if the user selects goods information on soccer shoes to buy soccer shoes that one of the soccer players puts on, the goods information on the soccer shoes may be displayed on the first panel region as shown in FIG. 25B. However, since this case is not the case that the main image itself is changed to a different content as in FIGS. 24A to 24E, a reduced main image 85 may be displayed on a part of the second panel region so that the user can continue watching the main image. In a similar method to that of FIGS. 24A to 24E, the images displayed on the first panel region and the second panel region may be interchanged with each other in a continuous operation. Also, if the user selects the reduced main image 85 using the remote controller 200, the main image may return to the first panel region 111 as shown in FIG. 25C.

Figure 26A:
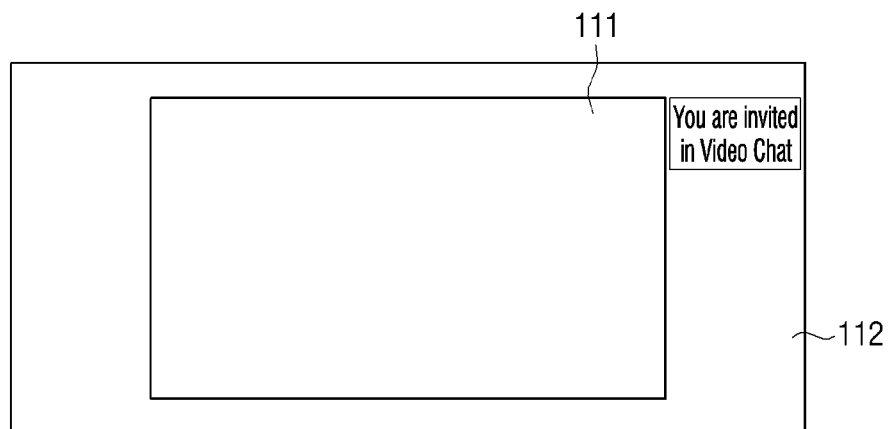
FIGS. 26A to 26C are views to explain an operation of performing video chat through a second panel region.
Figure 26B:
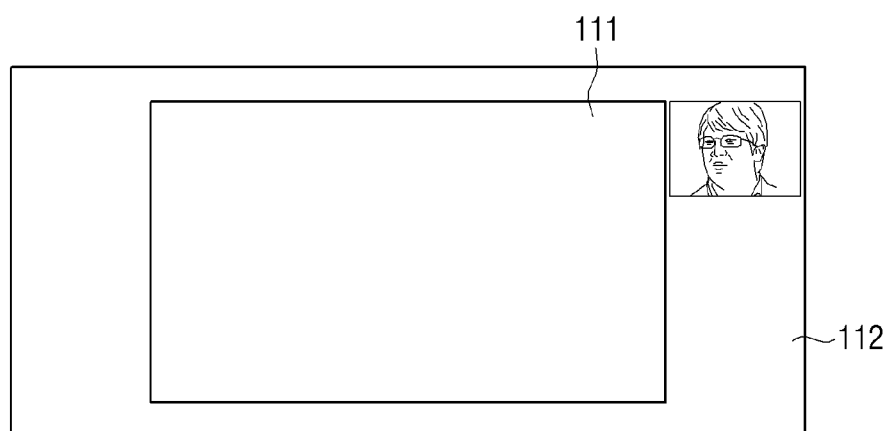
Figure 26C:
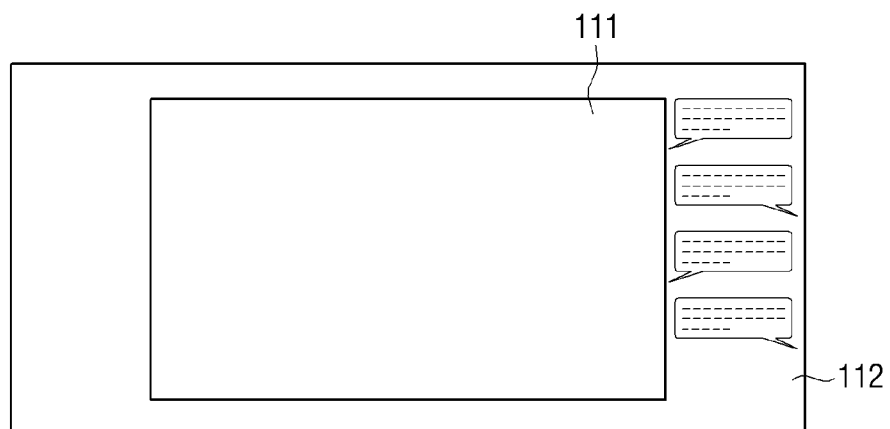

FIGS. 26A to 26C are views to explain an operation of performing a video chat through the second panel region. If the user is requested to participate in a video chat by another user when using the display apparatus 100, a message 90 informing that the user is invited to a video chat by another user may be displayed on the second panel region 112 as shown in FIG. 26A. After that, a user interface (UI) to receive user selection to accept or reject the video chat request may be displayed. If the user accepts the video chat request, a friend's image is displayed on the second panel region 112 as shown in FIG. 26B so that the video chat service can be used. Also, a text chat may be performed in the same way, and dialogue messages are displayed on the second panel region as shown in FIG. 26C so that a text chat service can be used. If a new message is registered at an SNS or a broadcast program that is added to user's favorite starts, the display apparatus 100 displays a message informing this on the second panel region 112 and provides the SNS service or displays the broadcast program according to user selection.

Figure 27A:
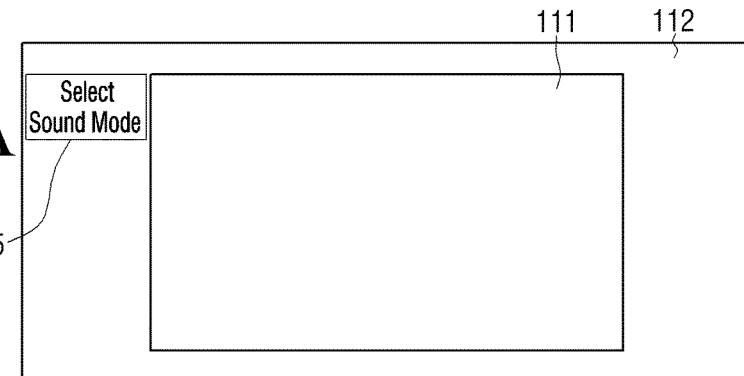
FIGS. 27A to 27D are views to explain an operation of providing a sound mode corresponding to a characteristic of an image and displaying graphic effects on a second panel region.
Figure 27B:
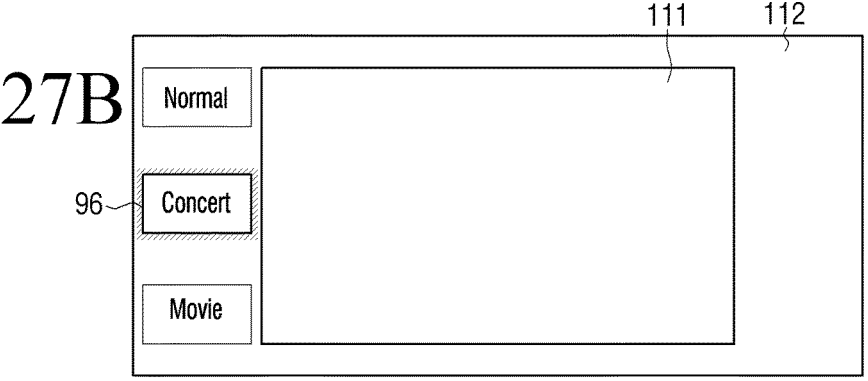
Figure 27C:
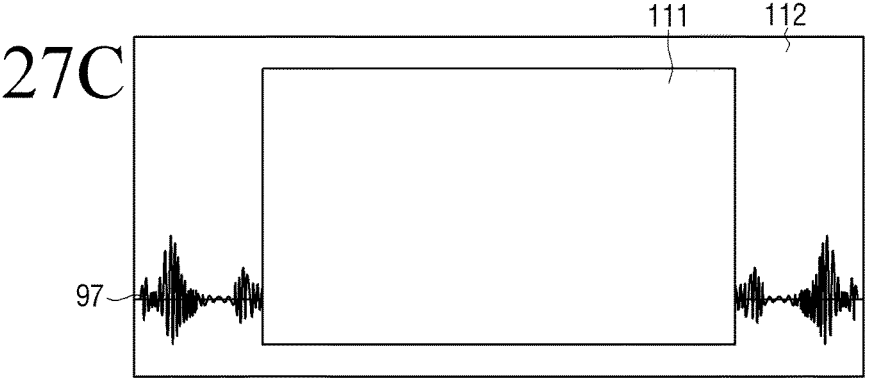
Figure 27D:
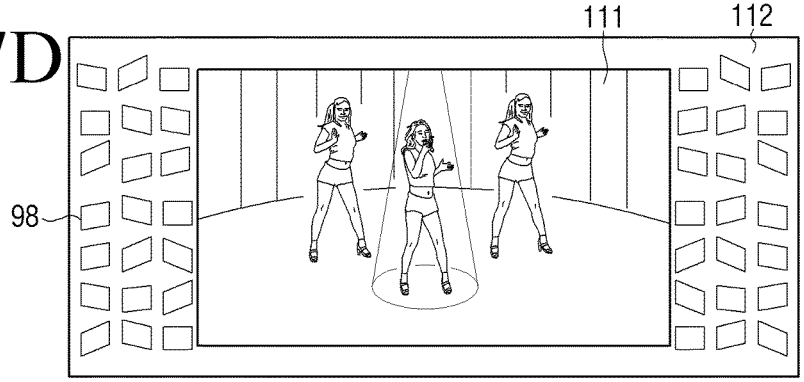

FIGS. 27A to 27D are views to explain an operation of providing a sound mode corresponding to a characteristic of an image and displaying graphic effects on the second panel region. In general, a different sound characteristic is requested according to a type of a content. For example, a sound characteristic requested when the user watches a movie is different from that requested when the user watches a concert video. If a sound mode appropriate to a content displayed on the first panel region 111 is different from a current sound mode, a message 95 informing that a sound mode can be changed or selected may be displayed on the second panel region 112 as shown in FIG. 27A. If the user inputs a command to change the sound mode, a list of selectable sound modes (or objects or icons) may be displayed on the second panel region 112 as shown in FIG. 27B. In order to facilitate user section, highlight 96 may be displayed on a sound mode appropriate to the content displayed on the first panel region 111. If the user selects one of the sound modes, graphic effects corresponding to the selected sound mode may be displayed on the second panel region 112. For example, a sound graph 97 corresponding to the output sound may be displayed as shown in FIG. 27C, and, if the user watches a concert video, graphic effects 98 creating a concert atmosphere may be displayed as shown in FIG. 27D.

According to various exemplary embodiments described above, the user can be provided with various contents without being hindered and can control the display apparatus easily and intuitively.

The foregoing exemplary embodiments and advantages are merely exemplary and are not to be construed as the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display panel unit comprising a first panel unit and a second panel unit;
a panel driving unit configured to drive the first panel unit and the second panel unit independently; and
a controller configured to control the panel driving unit to display a main image on the first panel unit, display an additional image on the second panel unit, and display at least one object on the first panel unit and the second panel unit and across a boundary between the first panel unit and the second panel unit while the main image is displayed on the first panel unit and the additional image is displayed on the second panel unit,
wherein the main image, the additional image, and the at least one object are different from each other,
wherein the first panel unit is disposed on a center region of the display panel unit and the second panel unit is disposed on a region outside of the center region,
wherein the second panel unit is configured to adjust transparency of an entire surface of the second panel unit from a transparent state to a black opaque state; and
wherein the panel driving unit is configured to turn off the first panel unit while the second panel unit displays the additional image when there is no main image to display, and turn off the second panel unit while the first panel unit displays the main image when there is no additional image to display.

2. The display apparatus as claimed in claim 1, wherein the panel driving unit comprises:
a first panel driving unit which drives the first panel unit; and
a second panel driving unit which drives the second panel unit.

3. The display apparatus as claimed in claim 2, further comprising:
a first signal processor which signal processes the main image and provides the processed main image to the first panel driving unit; and
a second signal processor which signal processes the additional image and provides the processed additional image to the second panel driving unit.

4. The display apparatus as claimed in claim 1, wherein the additional image comprises at least one of a pre-set widget, a pre-set icon, pre-set graphic effects, an image regarding the main image, additional information regarding the main image, and graphic effects regarding the main image.

5. The display apparatus as claimed in claim 1, wherein the second panel unit comprises:
   a first panel; and
   a second panel which is disposed on a rear surface of the first panel and adjusts transparency.

6. The display apparatus of claim 5, wherein the first panel unit and the first panel of the second panel unit are embodied together by a single panel.

7. The display apparatus of claim 1, wherein the first panel unit is a liquid crystal display (LCD) panel or an organic light emitting diode (OLED) panel, and the second panel unit is an LCD panel or an OLED panel.

8. The display apparatus of claim 2, further comprising:
   a first image processor which signal processes the main image and provides the processed main image to the first panel driving unit; and
   a second image processor which signal processes the additional image and provides the processed additional image to the second panel driving unit.

9. The display apparatus as claimed in claim 1, wherein the region outside of the center region comprises at least one of an upper region, a lower region, a right region, and a left region.

10. The display apparatus as claimed in claim 1, wherein the display panel unit is embodied by a physically single panel, and the first panel unit and the second panel unit are realized by a same type of panel.

11. The display apparatus as claimed in claim 1, wherein the second panel unit comprises:
   a first panel; and
   a second panel which is disposed on a rear surface of the first panel and adjusts transparency, and
   wherein the first panel unit is adjusted to an opaque state and the second panel unit is adjusted to a transparent state by adjusting the transparency of the second panel.

* * * * *